United States Patent [19]

Takiguchi et al.

[11] 4,428,313
[45] Jan. 31, 1984

[54] ELECTROMECHANICAL ACTUATOR FOR A SEWING MACHINE

[75] Inventors: Michitaka Takiguchi; Nobuyuki Naganuma; Fujio Horie, all of Nagoya, Japan

[73] Assignee: Brother Kogyo Kabushiki Kaisha, Nagoya, Japan

[21] Appl. No.: 342,111

[22] Filed: Jan. 25, 1982

[30] Foreign Application Priority Data

Jan. 30, 1981 [JP] Japan ................................. 56-13690

[51] Int. Cl.³ ..................... D05B 69/10; D05B 3/02
[52] U.S. Cl. ............................. 112/220; 112/158 E; 310/36
[58] Field of Search ............... 112/220, 221, 158 R, 112/158 E; 310/36, 38, 12, 13, 14

[56] References Cited

U.S. PATENT DOCUMENTS

| | | | |
|---|---|---|---|
| 3,924,146 | 12/1975 | George | 310/36 |
| 4,143,606 | 3/1979 | Herr et al. | 112/158 E |
| 4,254,720 | 3/1981 | Bianchi | 112/158 E |

*Primary Examiner*—Peter P. Nerbun
*Attorney, Agent, or Firm*—Carroll F. Palmer

[57] ABSTRACT

An electromechanical actuator is formed in flat and thickness reduced configuration having a stator, a movable portion to drive or control a needle positioning mechanism and a work feed regulating mechanism or the like in response to electrical signals. Said stator portion includes a pair of parallel spaced yokes to define a single air gap therebetween, and a plate-like permanent magnet secured to an inner wall of at least one of said yokes, the magnet being magnetized so that oppositely directed flux fields are established within the air gap. Said movable portion includes planar armatures disposed in said flux fields to pivotally move with the fulcrums placed at the opposed peripheral portion, and exciting windings each carried by said armatures.

6 Claims, 12 Drawing Figures

ELECTROMECHANICAL ACTUATOR FOR A SEWING MACHINE

BACKGROUND OF THE INVENTION

This invention relates to an improved electromechanical actuator for driving or controlling a plurality of regulating mechanisms such as a needle positioning mechanism and/or a work feed regulating mechanism, each operatively influencing the formation of successive stitches.

In the prior sewing machine, linear or oscillating actuators have been introduced which drive or control a plurality of regulating mechanisms such us a needle positioning mechanism or a feed regulating mechanism for use in the formation of stitches. As a consequence, the actuators must be arranged individually within a casing of a sewing machine. The space within the casing is, however, limited so that it becomes extremely troublesome when actuators are mounted together with other components in said casing.

In order to overcome the shortcomings found in the prior art, an electrical motor arrangement is disclosed in U.S. Pat. No. 4,143,606 issued Mar. 13, 1979 and Pat. No. 4,092,569 issued May 30, 1978. That is to say, the motor includes a pair of permanent magnets arranged in spaced opposite polar relationship to define magnetic field there-between, and three cylindrical armatures disposed within said field, and output shafts each connected integral with said armatures so that a needle positioning mechanism and other mechanisms will be driven through said output shafts.

However, in the motor disclosed, the magnet is flat-shaped while the armatures have a cylindrical configuration. The air gap between the magnet and the armature differs at each circumferential point of the armature. This results in the average air gap being relatively wide so that a big magnet is required to compensate for large leakage of flux. Eventually the disclosed motor will unavoidably become big in size.

SUMMARY OF THE INVENTION

It is an object of the invention to provide an electromechanical actuator which is of reduced thickness and compact type, without losing advantages of a structually unified frame into which a plurality of armatures are packaged, thereby allowing a designer easier work both on selecting a setting place and mounting in the sewing machine.

In accordance with this invention an improved actuator for a sewing machine is provided with plural armatures within a single air gap formed in the unified frame as a space for at least one set of two opposed magnetic fields, the armatures each being capable of individually driving a plurality of regulating mechanisms in a way similar to the prior art. For attaining the foregoing object each armature is flat-shaped or planar so that a flux field forming surface may be parallel thereto and further is pivotally mounted on the unified frame, carrying a planar exciting winding. Due to the flat-shaped or planar structure of the armature, the air gap between the flux field forming surface and the armature can be rendered uniform and relatively small, thereby maintaining the uniform magnetic fields with less leak flux. Thus the actuator is substantially reduced in thickness as a whole, allowed low inertia and high torque characteristics.

These and other advantages of the invention will be best understood upon reading the following description of the invention with the accompanying drawings as described herein below.

DETAILED DESCRIPTION OF THE INVENTION

Figure 1:
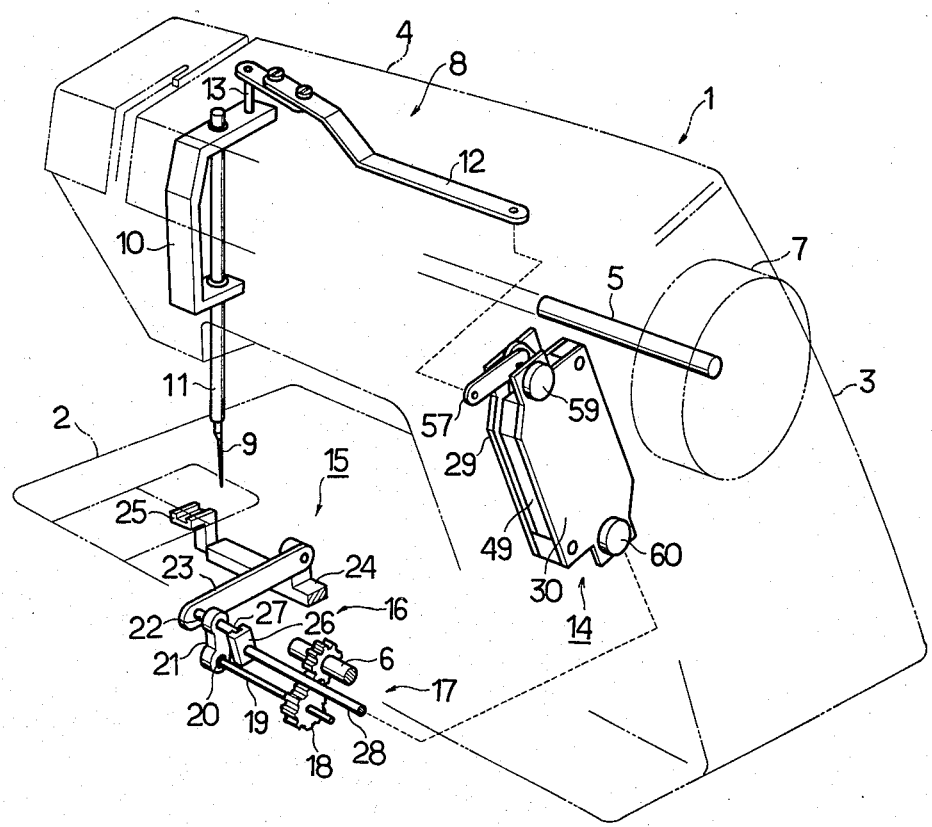
FIG. 1 is a perspective view of a sewing machine partially in phantom illustrating an actuator of a first embodiment of the invention containing mechanisms therein for controlling various functions of said machine.
Figure 2:
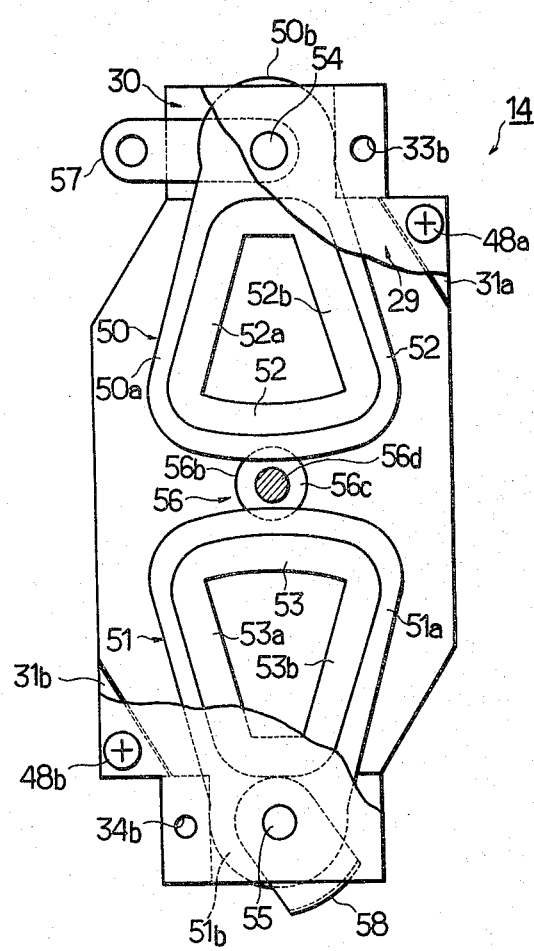
FIG. 2 is a plan view of an actuator of a first embodiment of the invention with its yoke partially removed.
Figure 3:
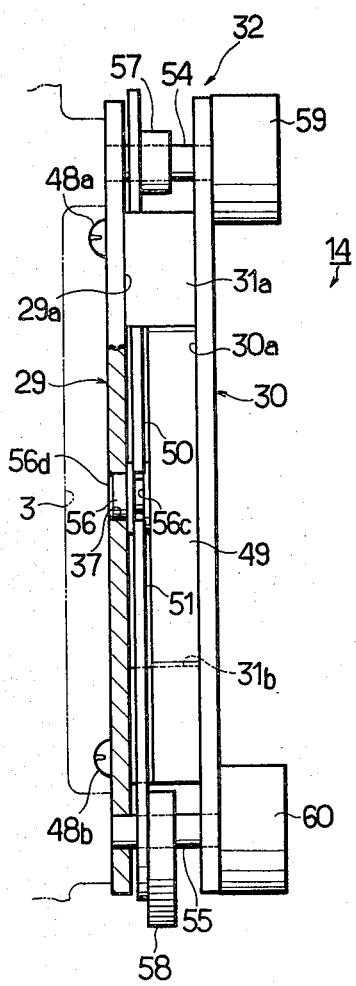
FIG. 3 is a side elevational view of an actuator partially in section.
Figure 4:
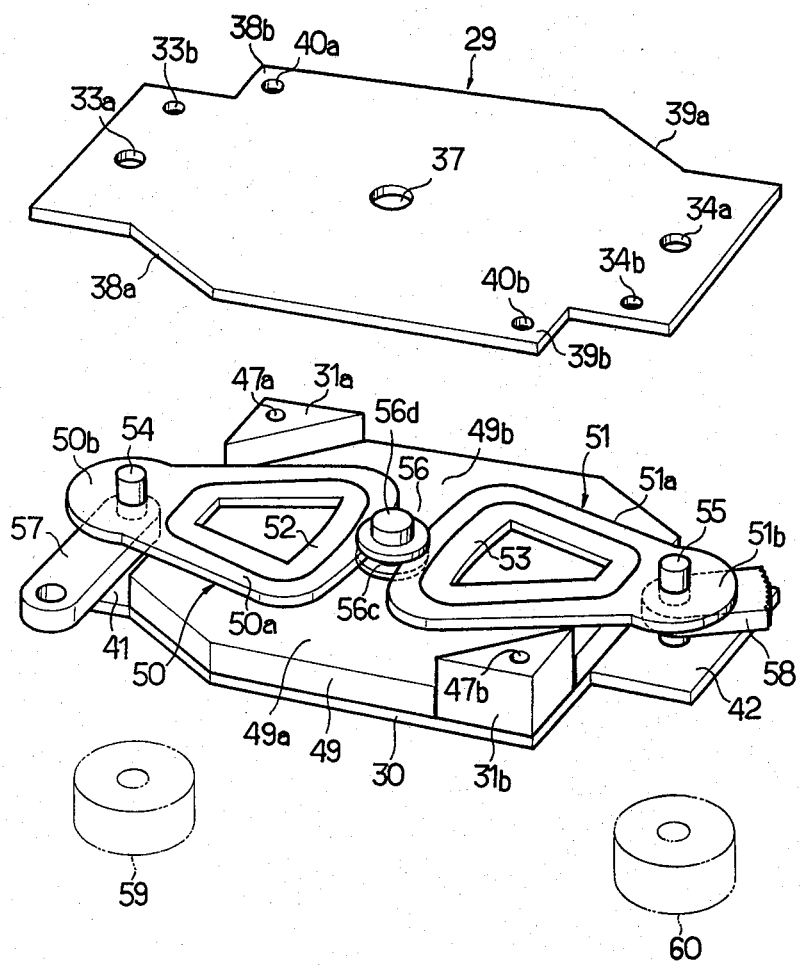
FIG. 4 is a perspective view of an actuator with a yoke exploded.
Figure 5:
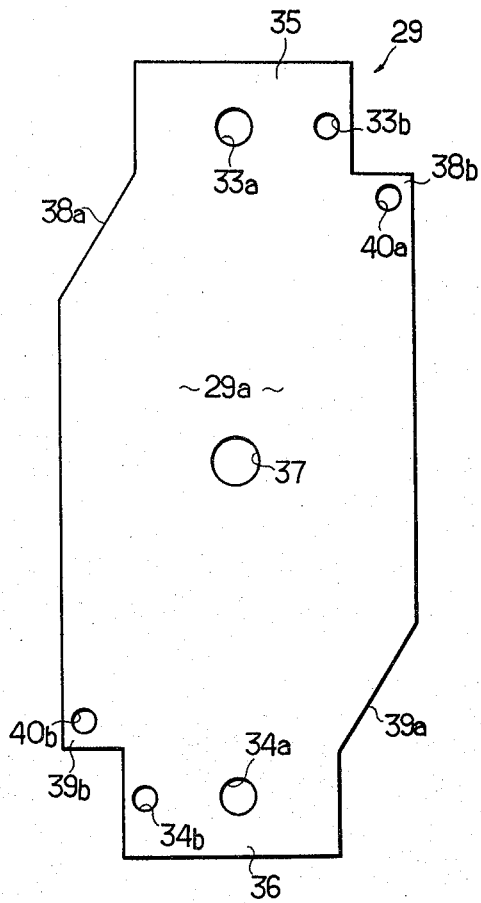
FIG. 5 and FIG. 6 are plan views of first and second yokes.
Figure 6:
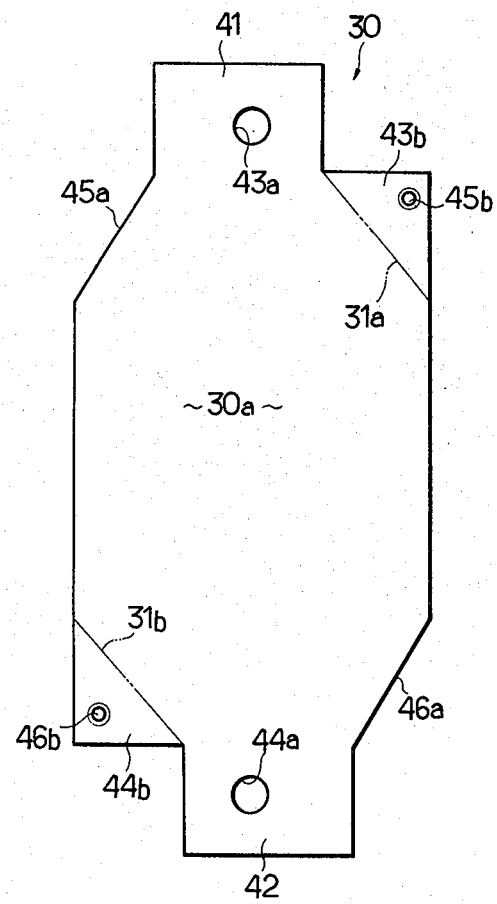

Referring to the drawings of FIGS. 1–10, a first embodiment of the invention will be described hereinafter. In FIG. 1 there is shown a sewing machine, a casing 1 of which comprises a hollow standard 3 rising from a bed 2 and a bracket arm 4 laterally extending from the top of said standard 3. Within said casing 1, are an arm shaft 5 and a bed shaft 6 arranged, each connected to a drive motor (not shown) through a well-known mechanism including a pulley 7. A needle positioning mechanism 8 disposed within the bracket arm 4 controls lateral position of a needle 9 carried by a needle bar as described hereinafter. The mechanism per se is well known to these skilled in the art and its detailed drawing is omitted. A U-shaped gate member 10, which directly controls the jogging movement of the needle 9, has the needle bar 11 vertically reciprocated in combination with the movement of the arm shaft 5. Said gate member 10 has one end connected via a shaft 13 to one end of a drive link 12 in order to provide lateral jogging movement with said needle 9. The other end of said link 12 is connected through a transmission (not shown) to an actuator 14 as described hereinafter. A work feed mechanism 15, which includes a feed regulator 16 and a feed regulating mechanism 17, is arranged within the bed 2, and feeds fabrics in a predetermined direction with stitching accompanied. In the feed mechanism 15, the rotary movement of the bed shaft 6 is transmitted through a gear mechanism 18, a feed drive shaft 19 to a cam 20, and the movement of the cam 20 is further transmitted though a pitman 21, a shaft 22 to a link 23 to provide it with an oscillating movement. The movement of the link 23 is transmitted through a feed bar 24 to a feed dog 25 to impart a work feed motion. The feed regulator 16 includes a slotted feed regulating guide way 26 secured to a rock shaft 28 as well known to those skilled in the art, and controls the work feed increment and direction each time the dog 25 moves. One end of the shaft 22 penetrated into the pitman 21 is disposed in sliding relationship with a slot 27 of the guideway 26. Therefore, the rock shaft 28 in its rotational movement imparts a rocking motion to the guideway 26, and determines through the inclination of the guideway 26 the extent of throw, the traval length and the direction of the feed stroke of the feed dog 25. Thus the inclination of the guideway 26 due to the feed regulating mechanism 17 determines the regulation from the feed regulator 16.

Figure 7:
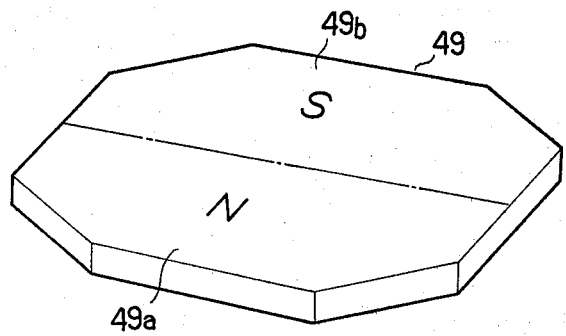
FIG. 7 is a perspective view of a permanent magnet.
Figure 8:
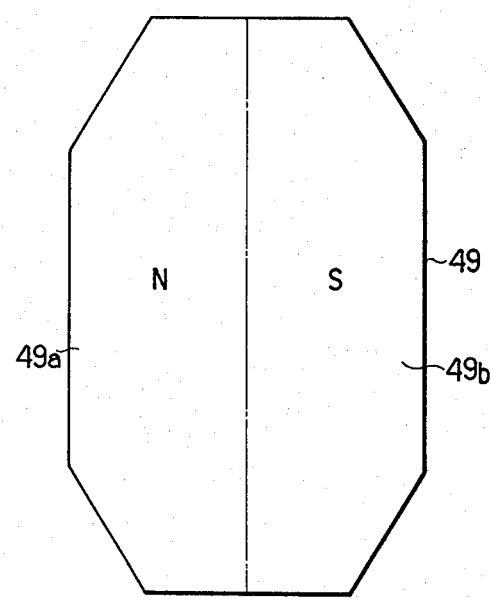
FIG. 8 is a plan view of said permanent magnet.
Figure 9:
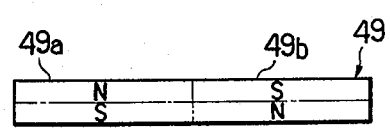
FIG. 9 is a front elevational view of said permanent magnet.
Figure 10:
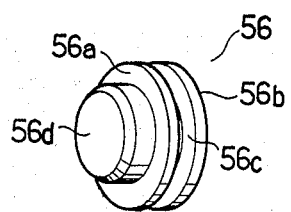
FIG. 10 is a perspective view of a guide member.

In order to perform said functions, the operational displacement from the actuator 14 is transmitted to the shaft 28 in its rotational movement. The actuator 14, which controls the needle positioning mechanism 8 and the feed regulating mechanism 17, is disposed in said hollow standard 3 as in detail seen in FIGS. 2-10. The actuator comprises a frame 32 having a pair of magnetically permeable plate-like yokes 29, 30, and a pair of triangular-shaped spacers 31a, 31b. The first yoke 29 is substantially formed elongated so that both lengthwise ends have rectangular supporting areas 35 and 36, each area having holes 33a, 33b and holes 34a, 34b as clearly seen in FIG. 5. In the intermediate portion between the areas 35 and 36 is an aperture 37 provided. The crosswise side of the supporting area 35 is cut to form a ramp portion 38a and a shoulder portion 38b, while the crosswise side of the area 36 is, in the same manner as above described, cut to form a ramp portion 39a and a shoulder portion 39b, each registering diagonally with the portion 38a and the portion 38b. In this situation, the shoulder portions 38b and 39b have openings 40a and 40b. Meanwhile, the yoke 30 is substantially similarly formed to the first yoke 29 except for somewhat narrower supporting areas 41, 42 than the areas 35, 36. The yoke 30 has holes 43a and 44a corresponding in turn to said holes 33a and 34a, and ramp portions 45a and 46a corresponding in turn to said ramp portions 38a and 39a, and shoulder portions 43b and 44b carrying screwed holes 45b and 46b which in turn correspond to the openings 40a and 40b. The spacer 31a is interposed between the shoulder portions 38b and 43b, and fixed by a screw 48a driven from the opening 40a into the hole 45b through the hole 47a provided in the spacer 31a, while the other spacer 31b is interposed between the shoulder portions 39b and 44b, and fixed by a screw 48b driven from the opening 40b into the hole 46b through the hole 47b provided in the spacer 31b. In this way, the parallel spaced relationship is maintained by the spacers 31a and 31b between the yokes 29 and 30, so that a single air gap is set up between the parallel faced inner walls 29a and 30a in the frame 32. To the inner wall 30a of the yoke 30 is a plate-like permanent magnet 49 secured by means of an adhesive or the like, the thickness of which is sufficiently reduced so that the magnetic field is established between magnet 49 and the inner wall 29b of the yoke 29. As a modified form, it is noted that a permanent magnet (not shown) may be secured to each of both inner walls 29a and 30a so that the magnetic field is developed between said two magnets. Reverted to the first embodiment, the magnet 49 is magnetized in such a manner that the polarity is shown by the denotations N. S and the magnetic boundary by the dot-dash lines seen in FIGS. 7-9. The magnetization is such that a pair of uniform magnetic fields 49a and 49b (denoted for convenience as seen in FIGS. 7-9) are produced in opposite directed flux relationship between the magnet 49 and the inner wall 29a of the yoke 29. Within the frame 32 are a plurality of e.g. two planar armatures 50, 51 pivotally disposed to individually position in both magnetic fields 49a and 49b. The armature 50 (51) comprises a sector-shaped supporting means 50a (51a) and a sector-shaped exciting winding 52 (53) carried to said means 50a (51a) by means of molding. The end 50b (51b) opposite to the arcuate portion of the armature 50 (51) is secured to a pin 54 (55) rotatably received into both holes 33a and 43a (holes 34a and 44a) so that the armature 50 (51) pivots in unison with the pin 54 (55). The pivotally oscillating movement of the armature 50 (51) about the pin 54 (55) is caused from the fact that the half portion of the winding 52 (53) is subjected to one directed flux within the magnetic field 49a, while the rest half of the winding 52 (53) being subjected to the flux of opposite direction to that stated within the field 49b, and when energized the resultant lateral electromagnetic force is imparted to the winding 52, (53). A sheave-shaped guide member 56 made from non-magnetic material, e.g., a synthetic resin comprises two spaced circular disks 56a and 56b each concentrically secured to a stud 56d. The member 56 is interposed between the magnet 49 and the first yoke 29 with the top end of the stud 56d rigidly fitted into the aperture 37. The arcuate free portion of said armature 50 (51) is admitted into the groove 56c between two disks 56a and 56b to prevent the armature 50 (51) from accidentally striking the magnet 49 or the inner wall 29a of the yoke 29 during the pivotal movement. In the meanwhile, to the pins 54 and 55 are a link 57 and a sector gear 58 rigidly secured which are in turn connected to the drive link 12 through a transmission (not shown), and to the rock shaft 28 through a gear mechanism (not shown). To the outer wall of the yoke 30 are first and second potentiometers 59 and 60 secured so that the movement of the armature 50 (51) is transmitted to the potentiometers 59 and 60 through the pins 54 and 55. The potentiometers 59 and 60 generate voltage signals as a positional signal commensurate with the rotational displacement of the pins 54 and 55 i.e. the pivotal displacement of the armatures 50 and 51, and the signal is adapted to be fed to a controller circuit (not shown). The actuator 14, thus far constructed, is rigidly secured to the inner wall of the hollow standard 3 by means of screws (not shown) driven into it through the holes 33b and 34b. The actuator 14 is adapted to be controlled or driven by a driver circuit (not shown) which receives the positional signal from the potentiometers 59 and 60, and controls the intensity and direction of the current flowing through the windings 52 and 53. Energized windings 52 and 53 cause the armatures 50 and 51 to pivot along the plane perpendicular to the flux fields viz, laterally under the influence of the electromagnetic force. The armature 50 thus pivoted drives the needle positioning mechanism 8 via the link 57, while the other armature 51 drives the feed regulating mechanism 17 via the sector gear 58.

Figure 11:
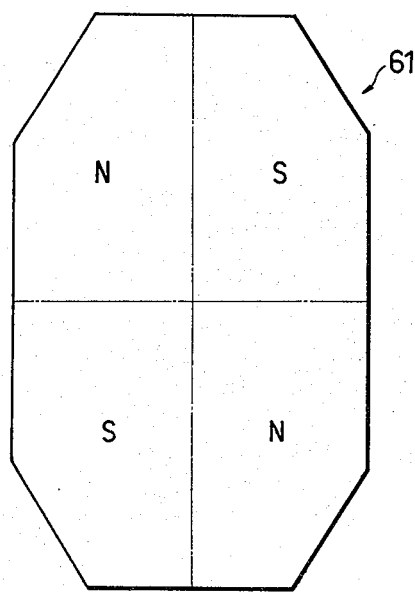
FIG. 11 is a view similar to FIG. 8 according to a second embodiment of the invention.

Now, referring to FIG. 11, a second embodiment of the invention will be described hereinafter. In the second embodiment, a plate-like permanent magnet 61 is provided which is magnetized to have two pairs of opposed polarities as seen in FIG. 11 so that two pairs of flux fields are produced, each pair of which have oppositely directed fluxes.

Figure 12:
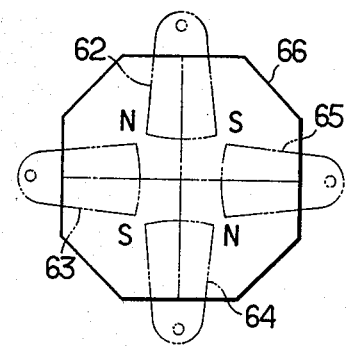
FIG. 12 is a view similar to FIG. 8 according to a third embodiment of the invention.

It is appreciated that other armatures may be added to those 50 and 51 of the first embodiment when desired to adjust the tension of needle thread or to control the amount of the needle thread to be taken up. For example, when four armatures are required, armatures from 62 through 65 in phantom are arranged over a permanent magnet 66 similarly magnetized to that of the second embodiment so as to be substantially located where the opposite polarities join. This manner is shown in FIG. 12 as a third embodiment of the invention.

With the structure of the electromechanical actuator 14, the following advantages are apparently obtained. That is, since it only requires a structurally unified actuator in order to drive a plurality of regulating mechanisms operative to influence the formation of successive stitches like a needle positioning mechanism and a feed regulating mechanism, it needs less space in setting. In association with the need of less space, the actuator 14 is mounted with less difficulty even if the other components had been installed in the casing 1.

The novel feature of the invention resides in that the armatures 50 and 51 are pivotally movably disposed within the uniform magnetic fields developed between the magnet 49 and the spaced flat wall 29 parallel to the same, the movement plane of the windings 52 and 53 carried by the armatures being perpendicular to the fluxes of the magnetic fields. Therefore, a stable electromagnetic force is applied to the armatures 50 and 51 regardless of the positions the former two occupy within the flux fields so that the smooth and stable pivotal movement of the armatures 50 and 51 are maintained.

Another novel feature of the invention lies in that the armatures 50 and 51 are in such planar-shaped configurations that the actuator 14 of significantly reduced thickness is maintained. With the planar-shaped armatures, the small air gap between the armature 50 (51) and the magnet 49 is held so that a high electromagnetic force is obtained with less turns of the winding 52 (53), thus allowing low intertia and high torque characteristics.

It is noted that a pair of spaced permanent magnets identified with those described in the above embodiments may be disposed within a single air gap in a frame to permit still higher torque characteristics.

In the meanwhile, since the actuator 14 is secured to the standard 3 which inherently requires high strength, it needs no reinforcement means or otherwise structurally simple one if any, even though the actuator 14 is subjected to high stresses.

Yet further, the hollow standard 3 is relatively spacious amoung other places of the casing 1, the actuator 14 is readily mounted without being interfered by other components installed.

In addition, the actuator 14 is secured to the standard 3 so that the shortest distance between the actuator 14 and the feed regulating mechanism 17 is maintained, thus allowing a shortest length of transmission like the rock shaft 28. Therefore, even when the regulating mechanism 17 needs a high working torque, an accurately workable feed mechanism 15 may be provided with a minimum torque loss because of the least torsion and/or strain.

It will be understood that various details of construction and arrangement of parts may be made without departing from the sprit of the invention except as defined in the appended claims.

What is claimed is:

1. In a sewing machine having a plurality of regulating mechanisms operative to influence the formation of successive stitches, an electromechanical actuator for positionally controlling the regulating mechanisms comprising;
   (a) a magnetic frame including two inner walls which define a single air gap therebetween.
   (b) permanent magnet means supported on at least one of said two walls to produce at least one set of two uniform magnetic fields within said air gap, said two magnetic fields being opposite to each other in direction,
   (c) a plurality of planar armatures pivotally mounted on said frame and respectively connected with said plurality of regulating mechanisms, each of said plurality of planar armatures carrying a planar exciting winding, said exciting winding being placed in said two magnetic fields to impart reversible movement to each of said plurality of planar armatures.

2. An electromechanical actuator as set forth in claim 1, wherein each of said plurality of armatures is pivotally movable about a pivot point disposed on the edge of said frame.

3. An electromechanical actuator as set forth in claim 2, including a guide member disposed in the middle of said frame for guiding the free edges of said plurality of armatures in the direction of said reversible movement.

4. An electromechanical actuator as set forth in claim 3, wherein said guide member is made from non-magnetic material.

5. An electromechanical actuator as set forth in claim 1, wherein said frame is secured to the hollow standard of the casing of said sewing machine.

6. An electromechanical actuator as set forth in claim 1, wherein said exciting winding is formed in a sector shape.

* * * * *